Sept. 29, 1964        R. G. LOUGHARY        3,150,807
DISPENSER FOR CHEWING GUM IN THE FORM OF A COIL
Filed Sept. 23, 1963
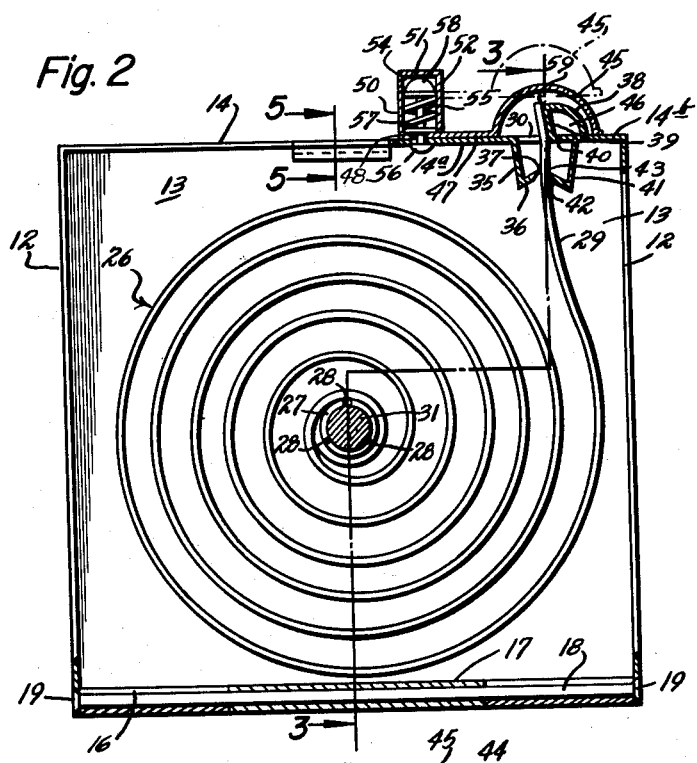
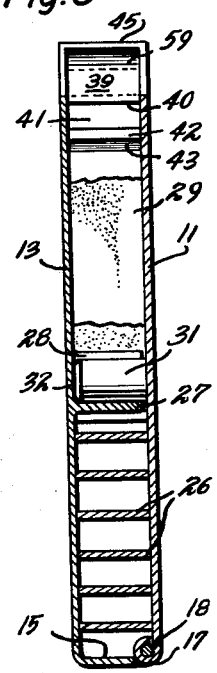
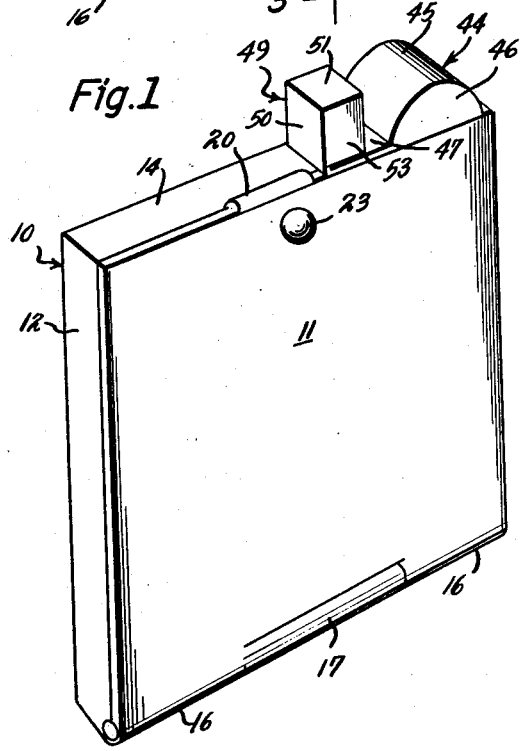
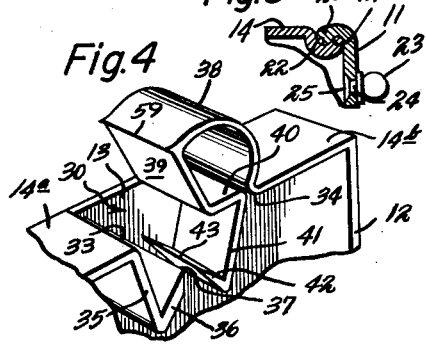
INVENTOR
*Roy G. Loughary*
BY *John A. Mawhinney*
ATTORNEY United States Patent Office 3,150,807
Patented Sept. 29, 1964

3,150,807
DISPENSER FOR CHEWING GUM IN THE
FORM OF A COIL
Roy G. Loughary, P.O. Box 6727, Portland, Oreg.
Filed Sept. 23, 1963, Ser. No. 310,722
6 Claims. (Cl. 225—47)

The present invention relates to a dispenser for chewing gum in the form of a coil and has for an object to provide a durable container for chewing gum in coiled form and from which the chewing gum may be readily and easily withdrawn as it is desired to be used.

Another object of the present invention is to provide a dispenser of this character in which the chewing gum may be stored to preserve its freshness and to maintain it in a clean condition until it has been entirely used up.

The present invention contemplates the provision of a dispenser of this type in which while the chewing gum may be quickly and readily withdrawn from the dispenser, means are provided for preventing a retrograde movement of the chewing gum back into the dispenser in an inaccessible position so that the free end of the coil of chewing gum is at all times within easy reach of the fingers of the user of the chewing gum to facilitate ready withdrawal of the chewing gum from the dispenser as desired.

Another objective of the present invention is to provide a chewing gum dispenser in which means are provided for the convenient severance of the free end portion of the coil of chewing gum from the remainder of the coil of gum.

The present invention also contemplates the provision of a sanitary cover for protecting the dispensing opening of the container, the severing means and the means for preventing a retrograde movement of the free end portion of the chewing gum into the container.

A still further object of the present invention is to provide a dispenser for chewing gum in the form of a coil which is small enough to be carried in the pocket of the user and is attractive in appearance.

A still further object of the present invention is to provide a dispenser of this kind which can be readily opened to afford access to the interior thereof for reloading the dispenser with a fresh coil of chewing gum.

In one of its broadest aspects the present invention provides a dispenser for chewing gum in the form of a coil comprising a container, means disposed within the container for supporting a coil of chewing gum therein, and guide means on the container for receiving and guiding the free end portion of the gum while the gum is being withdrawn from the supporting means and the container and for preventing retrograde movement of the free end portion of the gum into the container, so that the free end portion of the gum is always accessible for withdrawal from the container.

More specifically, the present invention contemplates the provision of a dispenser for chewing gum in the form of a coil comprising a container provided with a top wall having cut-away portions forming edges of said wall defining an opening through which the chewing gum is withdrawn, means within the container for supporting a coil of chewing gum therein, one of said cut-away portions comprising a first part extending inwardly from one of said edges of said wall and a second part extending at an angle from said first part toward the other of said edges of said wall and terminating in a penetrating edge facing in the direction of withdrawal of the chewing gum from the container, the other of said cut-away portions comprising an arcuate part extending upwardly from the other of said wall edges and then towards the said one wall edge, a second part extending inwardly from said arcuate part, a third part extending from said second part towards the said other wall edge, a fourth part extending inwardly from said third part and a fifth part extending at an angle from said fourth part towards the said first wall edge and terminating in a penetrating edge facing in the direction of withdrawal of the chewing gum from the container, said penetrating edges being spaced apart substantially a distance equal to the thickness of the chewing gum so that said penetrating edges cooperate to grip the chewing gum therebetween to prevent retrograde movement of the gum into the container, a closure for the chewing gum withdrawal opening mounted on said top wall and the means for resiliently holding said closure in its closed position comprising a casing having a bottom wall and forming part of the closure and positioned on the outer face of said top wall, a pivot pin in said casing having a first head engaging the inner face of the top wall and a second head disposed outwardly of and spaced from the outer face of said top wall and a resilient element embracing said pivot pin and having one end engaging said bottom wall of said closure and its other end engaging said second head of the pivot pin.

Other objects, features and advantages of my invention will be apparent from the following description when considered together with the accompanying drawings.

In the drawings, wherein like reference numerals denote corresponding parts throughout the several views:

FIGURE 1 is a perspective view of the dispenser constructed in accordance with the present invention, FIGURE 2 is a front elevational view of the dispenser with the hinge cover opened and the hinge shown in section and with parts broken away, FIGURE 3 is a sectional view taken on the line 3—3 of FIGURE 2, FIGURE 4 is an enlarged fragmentary perspective view of the means for preventing retrograde movement of the chewing gum into the dispenser and of the severing means, and FIGURE 5 is a sectional view taken on the line 5—5 of FIGURE 2.

Referring more particularly to the drawings the dispenser for the chewing gum comprises a container generally indicated at 10 and a closure 11 therefor. The container 10 comprises side walls 12 which are joined together by a back wall 13, a top wall 14 and a bottom wall 15.

The closure 11 which forms the front wall of the dispenser is hingedly mounted on the bottom wall 15 of the container 10 so that the closure 11 can be swung to open position to afford access to the interior of the container 10 for the purpose of recharging the container with a fresh coil of chewing gum. For this purpose the lower edge portion of the closure 11 is provided with a pair of spaced-apart knuckles 16 and the bottom wall 15 of the container is provided with a knuckle 17 which is received within the space between the knuckles 16 and is in alignment therewith so that a hinge pin 18 is received by and extends through the knuckles 16 and 17 and has its opposite ends upset as indicated at 19 to prevent the escape of the hinge pin 18 from the knuckles. In order to retain the closure 11 in its closed position the intermediate portion of the upper edge of the closure 11 is formed with an inturned beaded part 20 which is spaced slightly from the inner surface of the closure 11 to form therewith a pocket 21. The intermediate portion of the top wall 14 of the container 10 is then turned downwardly and then upwardly to provide a semicircular recess 22 for receiving the beaded part 20 of the closure 11 and the free end part of the recess forming portion of the top wall 14 is received by the pocket 21 of the closure 11 when the closure is in its closed position. This structure provides a resilient means for retaining the closure 11 in its closed position. In order to facilitate the opening of the closure 11 when desired, a hand piece or pull in the form of a ball 23 having a shank 24 extending through an appropriate opening in the closure 11 is secured to the closure by upsetting the inner free end of the shank as indicated at 25.

For supporting a coil of chewing gum 26 the back wall 13 of the container is provided at substantially its central portion with a core or stationary drum 27 which may be formed integral with the back wall 13 or secured thereto as by welding or the like and which extends from the inner face of the back wall at substantially right angles thereto. This core 27 is hollow and has its free end open and may be in one integral cylindrical shaped piece or may be divided into three equal segments by the axially extending slits 28. The inner portion or convolution of the coil of chewing gum 26 is wound around the core 27 and in engagement therewith as can be seen from FIGURE 2 of the drawings. The succeeding convolutions of the coil of chewing gum are concentric with one another but are spaced from adjacent convolutions and the free end portion 29 of the coil of chewing gum is passed through a dispensing or withdrawal opening 30 formed in the top wall 14 of the container 10.

For orienting the closure 11 during its closing movements a boss or hub 31 extends from the inner face of the closure 11 at substantially right angles thereto and at substantially the central portion thereof which boss is received by the core 27 as is shown in FIGURE 3 of the drawings. The outside diameter of the boss 31 is substantially the same as the inside diameter of the core 27 and is provided with a leading tapered end portion 32 for facilitating the entrance of the boss 31 into the core 27.

As can be seen more particularly from FIGURES 2 and 4 of the drawings the top wall 14 of the container 10 is made in two sections 14a and 14b. The first section 14a has a portion which is cut away from the back wall 13 of the container and the second section, 14b, has a portion cut away from the back wall 13. The respective edges 33 and 34 of the cut-away portions of 14a and 14b which remain attached to the back wall 13 define the dispensing or withdrawal opening 30 in the wall 14. The cut-away portion of section 14a of the wall 14 comprises a first part 35 which extends inwardly from the edge 33 and a second part 36 which extends at an angle from said first part toward the edge 34 of the cut-away portion of the section 14b of the top wall 14. The free end portion of the second part 36 terminates in a penetrating edge facing towards the dispensing opening 30 in the direction of withdrawal of the chewing gum from the container. This penetrating edge is indicated at 37.

The cut-away portion of the second section 14b of the top wall 14 comprises an arcuate part 38 extending upwardly from the edge 34 and then towards the edge 33 of the wall section 14a, a second part 39 which extends inwardly from said arcuate part 38, a third part 40 which extends from said second part towards the edge 34, a fourth part 41 which extends inwardly from said third part and a fifth part 42 which extends at an angle from said fourth part toward the second part 36 of the wall section 14a and terminates in a penetrating edge 43 facing in the direction of the withdrawal of the chewing gum from the container. The penetrating edges 37 and 43 are spaced apart substantially a distance equal to the thickness of the chewing gum being dispensed from the container so that the said penetrating edges cooperate to grip the chewing gum therebetween to prevent retrograde movement of the gum into the container.

For preventing the entrance of extraneous or foreign matters such as dirt and the like from entering the container 10 through the opening 30 and settling upon the coil of chewing gum within the container and the free end portion 29 thereof a sanitary cover indicated generally at 44 is provided. The cover 44 is adapted to be supported by the top wall 14 adjacent to the opening 30 therein. The sanitary cover 44 comprises an arcuate portion 45 having side walls 46, and attaching portion 47 provided with an opening 48 and a casing generally indicated at 49 and including a first portion 50 extending from said attaching portion 47 and forming one end wall of said casing, a second portion 51 extending from said first portion and forming the top wall of said casing, a third portion 52 extending from said second portion and forming the other end wall of the casing and a pair of portions 53 and 54 extending from the opposite sides of said second portion 51 and forming the two side walls of said casing.

The attaching portion 47 of the sanitary cover 44 rests upon the upper surface of the top wall 14 of the container 10 with the arcuate portion 45 disposed over and concealing the withdrawal opening 30 and the cut-away portions of the sections 14a and 14b of the top wall 14. A part of the attaching portion 47 which contains the opening 48 forms the bottom wall of the casing 49. A pin 55 extends through the opening 48 in the attaching portion 47 and through a suitably aligned opening in the top wall 14. The pin 55 at its lower end has an enlarged head 56 which is held in engagement with the undersurface of the top wall 14 of the container by means of a coil spring 57. The pin 55 has an upper enlarged head 58 and the coil spring 57 encircles the pin 55 and abuts against the head 58 at its upper end and against the bottom wall of the casing at its lower end. Since the lower head 56 of the pin 55 engages the lower face of the top wall 14 of the container the upward axial movement of the pin 55 is limited so that the force of the coil spring 57 exerts a downward push against the attaching portion 47 of the cover 44 and retains the cover 44 in the full line position shown in FIGURES 1 and 2 of the drawings so as to conceal the withdrawal opening 30 of the container.

In the use of the device the closure 11 will be opened by pulling outwardly and downwardly upon the knob 23 so that access can be had to the interior of the container 10. A coil 26 of chewing gum is then mounted on the core 27 and the free end of portion 29 of the coil of chewing gum is moved upwardly between the jaw portions 36 and 42 of the cut-away portions of the sections 14a and 14b of the top wall 14 until the free end of the portion of the chewing gum is disposed outwardly of the top wall 14. The closure 11 is then moved to its closed position as shown in FIGURE 1 and when it is desired to withdraw some of the chewing gum from the container an upward pull is exerted upon the casing 49 of the cover 44 so as to overcome the downward force of the coil spring 57. The sanitary cover 44 will then assume the phantom line position illustrated in FIGURE 2 of the drawings and access may be had to the free end portion 29 of the chewing gum which extends outwardly of the top wall 14 of the container.

The user will then withdraw as much of the chewing gum as he desires and the free end portion of the chewing gum which has been withdrawn is then brought into contact with the juncture point 59 between the arcuate part 38 and the second part 39 of the cut-away portion of the section 14b of the top wall 14. If desired this juncture point 59 may be sharpened sufficiently to sever the chewing gum at the desired point. As soon as the desired amount of chewing gum has been withdrawn and severed from the remainder of the free end portion 29 of the coil of chewing gum the upward force which had been previously exerted upon the casing 49 is removed and due to the action of the coil spring 57 the sanitary cover 44 will return to its full line position of FIGURES 1 and 2 and thus close off the withdrawal opening 30.

The dispenser may be made out of metal, plastic or any other suitable material and can be made in any desirable size, for example, the size of a conventional package of cigarettes.

In order to make the dispenser more appealing as a novelty to the teenage market, the coil of gum may be marked off in inches and/or the last part of the coil of chewing gum near the end thereof may be colored red or some other color similar to the end of an adding machine roll so as to warn the user that the end of the coil of chewing gum is near. The coil of chewing gum may be made up with adjacent areas of the coil made of different flavors, thereby increasing the novelty and the enjoyment of the use of the dispenser.

The core 27 will prevent the kinking of the coil of gum near the end thereof.

It will be noted from the arrangement of the portions 36 and 42 of the cut-away portions of the sections 14a and 14b of the top wall 14 that the free end portion 29 of the chewing gum can be easily withdrawn from the container through the opening 30 but that retrograde movement of the free end portion 29 of the chewing gum into the container 10 will be prevented by the penetrating edges 43 and 37 engaging the opposite faces of the free end portion 29 of the chewing gum, so that the free end portion 29 of the gum will at all times be readily accessible just above the opening 30 in the top wall 14 of the container.

While I have described the preferred embodiment of my invention, it is understood that this disclosure is for the purpose of illustration and that various omissions, or changes in arrangements of parts, as well as the substitution of equivalent elements for those herein shown and described, may be made without departing from the spirit and scope of the invention as set forth in the appended claims.

What is claimed is:

1. A dispenser for chewing gum in the form of a coil comprising a container provided with a top wall having cut away portions forming edges of said wall defining an opening through which the chewing gum is withdrawn, means within the container for supporting a coil of chewing gum therein, one of said cut away portions comprising a first part extending inwardly from one of said edges of said wall and a second part extending at an angle from said first part toward the other of said edges of said wall and terminating in a penetrating edge facing in the direction of withdrawal of the chewing gum from the container, the other of said cut away portions comprising an arcuate part extending upwardly from the other of said wall edges and then towards the said one wall edge, a second part extending inwardly from said arcuate part, a third part extending from said second part towards the said other wall edge, a fourth part extending inwardly from said third part and a fifth part extending at an angle from said fourth part toward the said first wall edge and terminating in a penetrating edge facing in the direction of withdrawal of the chewing gum from the container, said penetrating edges being spaced apart substantially a distance equal to the thickness of the chewing gum so that said penetrating edges cooperate to grip the chewing gum therebetween to prevent retrograde movement of the gum into the container.

2. A dispenser as claimed in claim 1, wherein the juncture of the arcuate part and the second part of the said other cut away portion provides a cutting device for severing gum.

3. A dispenser as claimed in claim 1, wherein a cover for the chewing gum withdrawal opening is mounted on said top wall and means are provided for resiliently holding said cover in its closed position comprising a casing having a bottom wall and forming part of the cover and positioned on the outer face of said top wall, a pin in said casing having a first head engaging the inner face of the top wall and a second head disposed outwardly of and spaced from the outer face of said top wall, a resilient element embracing said pin and having one end engaging said bottom wall of said cover and its other end engaging said second head of the pin.

4. A dispenser as claimed in claim 3, wherein said cover also comprises an arcuate portion having side walls disposed on said top wall of the container above said chewing gum withdrawal opening, an attaching portion having an opening therethrough for receiving therethrough said pin and forming said bottom wall of the casing of the cover, said attaching portion extending from one end of the arcuate portion, a first portion extending from said attaching portion and forming one end wall of said casing, a second portion extending from said first portion and forming the top wall of said casing, a third portion extending from said second portion and forming the other end wall of the casing and a pair of portions extending from the opposite sides of said second portion and forming the two side walls of said casing.

5. A dispenser for chewing gum in the form of a coil comprising a container, means disposed within the container for supporting a coil of chewing gum therein, and guide means on the container for receiving and guiding the free end portion of the gum while the gum is being withdrawn from the supporting means and the container and for preventing retrograde movement of the free end portion of the gum into the container so that the free end portion of the gum is always accessible for withdrawal from the container, said guide means comprising a pair of cooperating ever gripping substantially fixed holding members each having a biting part directed in the direction of withdrawal of the gum to bite at all times into opposite faces of the free end portion of the gum so that the free end portion of the gum cannot at any time escape from the holding members to prevent the said retrograde movement of the gum at all times.

6. A dispenser for chewing gum in the form of a coil comprising a container having a back wall, means for supporting a coil of chewing gum within the container including a core carried by said back wall, a closure hingedly mounted on said container for pivotal movement between a closed position in which it closes the container to protect the coil of chewing gum from extraneous matter and an open position in which access to the interior of the container is afforded so that a fresh coil of chewing gum can be placed upon said core, and means for resiliently holding the closure in its closed position, said core being hollow and provided with a plurality of axial slits so that the core is divided into resilient segments, a boss carried by said closure having an outside diameter substantially the same as the inside diameter of said core, the core and boss being so located on said back wall and said closure that during the pivotal closing movement of the closure the boss will enter the core to orient the closure to its proper closed position, the resilient segments of the core yielding sufficiently to guide said boss into said core and properly center the boss in the core.

References Cited in the file of this patent

UNITED STATES PATENTS

| | | |
|---|---|---|
| 2,251,823 | Cullen | Aug. 5, 1941 |
| 2,276,414 | Morehouse et al. | Mar. 17, 1942 |
| 2,476,593 | Gerbing | July 19, 1949 |
| 2,510,345 | McCann et al. | June 6, 1950 |
| 2,698,143 | Pottle | Dec. 28, 1954 |
| 3,002,668 | Castelli | Oct. 3, 1961 |